US006137078A

United States Patent [19]

Keller

[11] Patent Number: 6,137,078

[45] Date of Patent: Oct. 24, 2000

[54] NOZZLE FOR USE IN A TORCH HEAD OF A PLASMA TORCH APPARATUS

[75] Inventor: Silvano Keller, Boettstein, Switzerland

[73] Assignee: Sulzer Metco AG, Wohlen, Switzerland

[21] Appl. No.: 09/323,764

[22] Filed: Jun. 1, 1999

[30] Foreign Application Priority Data

Dec. 21, 1998 [CH] Switzerland ............................ 2516/98

[51] Int. Cl.[7] ........................................................ B23K 9/00

[52] U.S. Cl. .................................... 219/121.5; 219/121.47

[58] Field of Search ............................ 219/121.5, 121.47, 219/121.48, 75, 76.16; 118/666, 723 DC; 427/450

[56] References Cited

U.S. PATENT DOCUMENTS

| | | | |
|---|---|---|---|
| 3,183,337 | 5/1965 | Winzeler et al. | 219/76.16 |
| 3,197,605 | 7/1965 | Sunnen | 219/75 |
| 3,823,302 | 7/1974 | Muehlberger | 219/121.47 |
| 4,125,754 | 11/1978 | Wasserman et al. | 219/121.47 |
| 4,389,559 | 6/1983 | Rotolico et al. | 219/121.5 |
| 4,549,065 | 10/1985 | Camacho et al. | 219/121.48 |
| 4,851,254 | 7/1989 | Yamamoto et al. | 427/450 |
| 5,043,548 | 8/1991 | Whitney et al. | 219/121.47 |
| 5,099,788 | 3/1992 | Ito et al. | 118/666 |
| 5,328,516 | 7/1994 | Dietiker | 118/723 DC |

*Primary Examiner*—Teresa Walberg
*Assistant Examiner*—Quang Van
*Attorney, Agent, or Firm*—Tarolli, Sundheim, Covell, Tummino & Szabo L.L.P.

[57] ABSTRACT

The nozzle is provided with a plurality of cooling channels running from an annular channel located in an inlet region of the nozzle through the nozzle in longitudinal direction up to an outlet region of the nozzle. The powder supply channels provided for the supply of coating material are led between the cooling channels. A nozzle support member adapted for receiving the nozzle is provided with cooling ducts that are hydraulically connected to the cooling channels of the nozzle and constitute therewith a nozzle cooling circulation system. The advantages of this design can be seen in the facts that the nozzle is homogeneously and efficiently cooled up to its outlet end and that the danger of building-up molten deposits within the nozzle is substantially avoided.

14 Claims, 1 Drawing Sheet

NOZZLE FOR USE IN A TORCH HEAD OF A PLASMA TORCH APPARATUS

BACKGROUND OF THE INVENTION

The present invention refers to a nozzle for use in a torch head of a plasma torch apparatus, comprising a nozzle body member of essentially cylindrical configuration having a central longitudinal axis, an opening running through the nozzle body member, located coaxially with the central longitudinal axis, and having an inlet end and an outlet end, and a plurality of cooling channels running through the interior of the nozzle body member and arranged symmetrically around the central longitudinal axis. Moreover, the present invention refers to a nozzle assembly for use in a torch head of a plasma torch apparatus, comprising a nozzle as referred to herein above as well as a nozzle supporting member.

PRIOR ART

Nozzles for use in the torch head of a plasma torch apparatus, i.e. a so-called plasma gun, are known in the prior art in a wide variety of designs and constructions. Such nozzles, on the one hand, serve for concentrating the plasma stream in a desired manner and, on the other hand, take on the task of the anode in the sense that an electric arc required for creating the plasma stream is generated between the nozzle and a cathode located in a certain distance from the nozzle.

The German Patent Publication DE 1639325 discloses a plasma jet generator incorporating an anode nozzle of the kind referred to herein. The anode nozzle is provided with bores and, if appropriate, with channels for cooling the nozzle. In the region of the outlet end of the anode nozzle, there is provided a channel running substantially radially into the interior of the nozzle through which coating powder can be fed to the plasma stream. There is a danger associated with such anode nozzles insofar as the nozzle heats up in the region of the powder supply channel to such an extent that the coating powder is molten already in the interior of the powder supply channel, resulting in undesired residues or deposits of molten material. These deposits influence the cross sectional area of the nozzle and, thereby, the plasma jet, in a negative manner. Moreover, from time to time, such deposits become loose and are entrained with the plasma jet, with the result that they are deposited as clottings on the substrate to be coated.

Another problem arising in anode nozzles of the kind referred to herein may be seen in the fact that the nozzle body is insufficiently or inhomogenously cooled. Particularly in the region of the outlet end of the nozzle body, the anode nozzle known in the art are insufficiently cooled because the cooling channels thereof are not led up to the outlet end of the nozzle body. The reason for such a design is, on the one hand, to provide for sufficient space for the powder supply channel and for several powder supply channels, respectively, and, on the other hand, to ensure that the particular cooling channel can be led back in the interior of the anode nozzle.

OBJECTS OF THE INVENTION

Thus, it is an object of the invention to provide a nozzle as well as a nozzle assembly for use in a torch head of a plasma torch apparatus that has an improved an more homogenous cooling of the nozzle body member. It is a further object of the invention to provide a nozzle as well as a nozzle assembly for use in a torch head of a plasma torch apparatus in which the danger of deposit build-up in the interior of the nozzle body is avoided.

SUMMARY OF THE INVENTION

In order to meet these and other objects, the present invention provides, according to a first aspect, a nozzle for use in a torch head of a plasma torch apparatus, comprising a nozzle body member of essentially cylindrical configuration having a central longitudinal axis, an opening running through the nozzle body member, located coaxially with the central longitudinal axis, and having an inlet end and an outlet end, and a plurality of cooling channels running through the interior of the nozzle body member and arranged symmetrically around the central longitudinal axis.

At least two powder supply channels are located in the region of the outlet end of the central opening. The two powder supply channels extend in essentially radial direction with respect to the central longitudinal axis and open into the central opening.

Each of the cooling channels extends in axial direction through the nozzle body member up to the outlet end of the central opening, and each of the powder supply channels runs through the nozzle body member from the outside thereof and between two adjacent cooling channels to the central opening.

Due to the fact that the cooling channels continue in axial direction throughout the nozzle body member up to the outlet region of the nozzle, and further due to the fact that the powder supply channels run between the cooling channels radially through the nozzle body member, both a uniform cooling of the nozzle up to its outlet region is ensured and an improved cooling of the powder supply channels is achieved.

According to a second aspect, the present invention provides a nozzle assembly for use in a torch head of a plasma torch apparatus, comprising a nozzle including a nozzle body member of essentially cylindrical configuration having a central longitudinal axis, an opening running through the nozzle body member, located coaxially with the central longitudinal axis, and having an inlet end and an outlet end, and a plurality of cooling channels running through the interior of the nozzle body member and arranged symmetrically around the central longitudinal axis.

At least two powder supply channels are located in the region of the outlet end of the central opening. The two powder supply channels extend in essentially radial direction with respect to the central longitudinal axis and open into the central opening.

Each of the cooling channels extends in axial direction through the nozzle body member up to the outlet end of the central opening, and each of the powder supply channels runs through the nozzle body member from the outside thereof and between two adjacent cooling channels to the central opening.

Further, the nozzle assembly comprises a nozzle support member having a central opening adapted for receiving the nozzle body member, whereby the nozzle support member is provided with cooling ducts that are adapted to be hydraulically coupled to the cooling channels provided in the nozzle body member such as to constitute a nozzle cooling circulation system.

BRIEF DESCRIPTION OF THE DRAWINGS

In the following, an embodiment of the apparatus according to the invention will be further described, with reference to the accompanying drawings, in which.

DETAILED DESCRIPTION OF A PREFERRED EMBODIMENT

Figure 1:
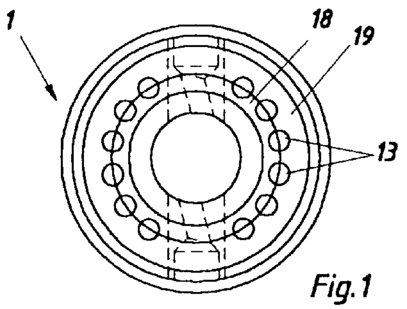
FIG. 1 shows a front elevation of an embodiment of the nozzle according to the invention.
Figure 2:
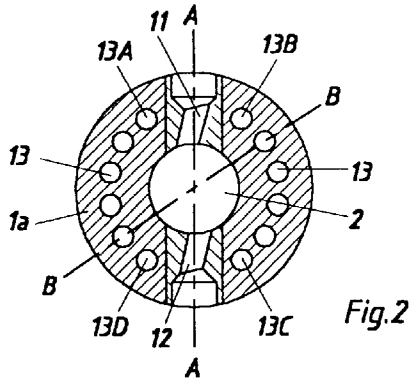
FIG. 2 shows a cross sectional view of the nozzle of FIG. 1.
Figure 3:
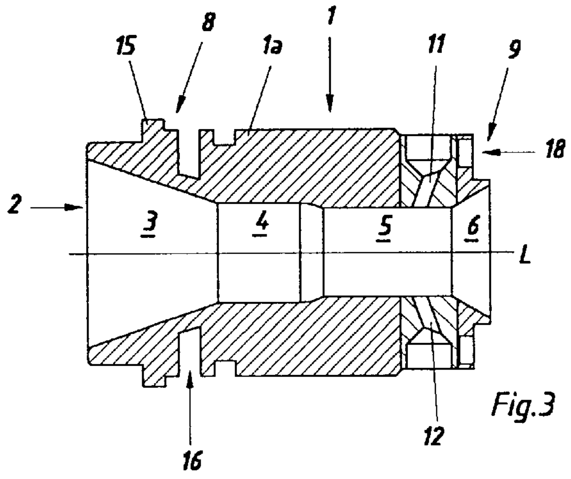
FIG. 3 shows a longitudinal sectional view of the nozzle of FIG. 1, taken along the line A—A in FIG. 2.
Figure 4:
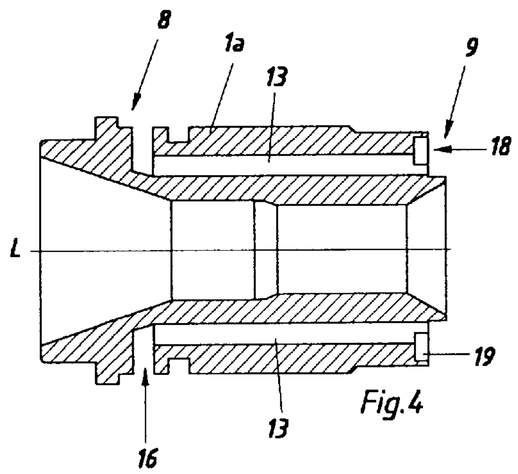
FIG. 4 shows a longitudinal sectional view of the nozzle of FIG. 1, taken along the line B—B in FIG. 2.

FIGS. 1–4 show an embodiment of a nozzle 1 for use in the torch head of a plasma torch apparatus in a front elevational view, in a cross sectional view, and in two different longitudinal sectional views. In the following, the design of that nozzle 1 shall be further explained, with reference to the above mentioned drawing figures. In view of the fact that the general design and function of such nozzles are well known to any person skilled in the art, only those characteristics of the nozzle 1 will be discussed in detail that are essential in connection with the present invention.Moreover, it is assumed that the nozzle 1 shall serve as an anode for creating a plasma torch and that the plasma gas flows through the nozzle 1, as seen in FIGS. 3 and 4, from the left side to the right side.

As can be seen from FIGS. 1 and 2, the nozzle 1 comprises a nozzle body member 1*a* of essentially cylindrical configuration that is provided with a central opening 2 as well as with a plurality of cooling channels 13, in the present example twelve cooling channels 13 that are arranged around the afore mentioned central opening 2. As seen in the flow direction of the plasma gas, mentioned above, the central opening 2 comprises a first conical portion 3, a first cylindrical portion 4, a second cylindrical portion 5 and a second conical portion 6. The first conical portion 3 constitutes the inlet region 8 of the nozzle 1, and the second conical portion 6 constitutes the outlet region of the nozzle 1. The nozzle 1 is provided with two powder supply channels 11, 12 that run radially through the body member 1*a* of the nozzle 1 and open into the central opening 2 thereof in front of the outlet region 9, as seen in the flow direction of the plasma gas. The powder supply channels 11, 12 are designed in such a way that a thorough mixing of the coating powder fed into the plasma torch is ensured that is as uniform as possible.

The nozzle body member 1*a* is preferably made of copper or of a copper alloy, whereby the interior of the nozzle body member la can be constituted, as is well known in the art, by a tungsten insert (not shown in the drawings) that substantially prolongs the operating life of the nozzle 1.

At the outside of the nozzle body member 1*a,* close to the above mentioned inlet region 8, there is provided a circumferential rib 15. Adjacent thereto and behind that rib 15, as seen in the flow direction of the plasma gas, an annular channel 16 is provided. All the afore mentioned cooling channels 13 are connected to that annular channel 16. Starting from the annular channel 16, all cooling channels 13 run in a direction parallel to a central longitudinal axis L of the nozzle 1 through the nozzle body member 1*a*. At the end of the outlet region 9, the nozzle body member 1*a* is provided with an annular rear face 18; all the afore mentioned cooling channels 13 open into that rear face 18. Moreover, the rear face 18 of the nozzle body member 1*a* is provided with an annular groove 19 surrounding the cooling channels 13, whereby the inner side of the annular groove 19 adjoins to the cooling channels 13. The powder supply channels 11, 12 are located opposite to each other, whereby the distance between the cooling channels 13A and 13B, as well as between the cooling channels 13C and 13D (see FIG. 2) is greater than the distance between the other adjacent cooling channels 13; thus, the powder supply channels 11, 12 can extend between the afore mentioned cooling channels 13 onto the interior of the nozzle body member 1*a,* i.e. into the central opening 2.

Figure 5:
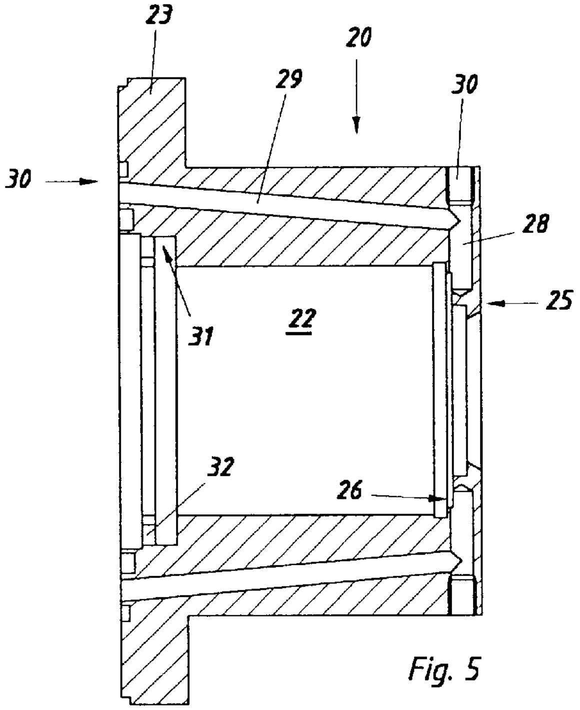
FIG. 5 shows a longitudinal sectional view of an embodiment of a nozzle support member.

In FIG. 5, there is shown an embodiment of a nozzle support member 20, provided with a central opening 22 adapted to receive the nozzle 1. At its outside, the nozzle support member 20 comprises a circumferential collar 23 in which are inserted a plurality of fixing bores (not visible in the drawings). The other side of the nozzle support member 20, opposite to the collar 23, is provided with a collar 25 protruding into the central opening 22. That collar 25 comprises a recess 26 having a shape and a dimension that correspond to the ones of the annular groove 19 of the nozzle 1 (see FIG. 4). Moreover, the nozzle support member 20 is provided with a plurality of cooling ducts 29 running along the longitudinal extension of the nozzle support member 20 and opening to the exterior in the region of the left front face 30 of the nozzle support member 20. Passages 28 provided in the nozzle support member 20 interconnect the recess 26 and the cooling ducts 29.

Further, the interior of the nozzle support member 20 is provided with an annular groove 31 corresponding in shape and position to the annular channel 16 of the nozzle 1 (see FIG. 3).

Figure 6:
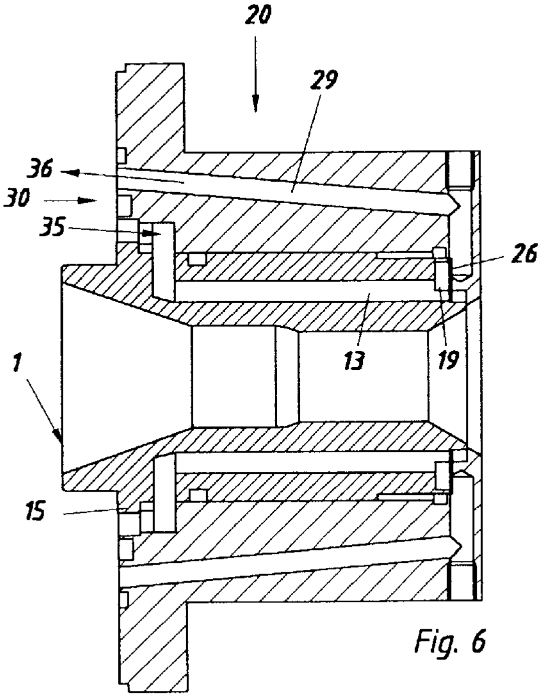
FIG. 6 shows a longitudinal sectional view of the nozzle support member of FIG. 5 having a nozzle according to FIGS. 1–4 inserted therein.

FIG. 6 shows a longitudinal sectional view of the nozzle support member 20 of FIG. 5 having a nozzle 1 according to FIGS. 1–4 inserted therein. Upon inserting the nozzle 1 into the nozzle support member 20, the circumferential rib 15 of the nozzle 1 acts as a stop member and, thus, defines the position of the nozzle 1 in the nozzle support member 20. It is clearly evident from FIG. 6 that the cooling ducts 29 of the nozzle support member 20 are hydraulically connected to the cooling channels 13 of the nozzle 1, with the result that, in this way, a cooling circulation system is constituted in which the cooling medium circulating in the system is forced to flow through the bores, ducts and channels 13, 28 and 29 provided in the cooling circulation system. By providing the annular groove 19 of the nozzle 1 and the recess 26 of the nozzle support member 20 communicating therewith, it is ensured that no substantial narrowing of the cross sectional area exists in the transition region.

It has to be noted that the cooling circulation system is designed in such a way that not only the inlet 35, but also the outlet 36 open up into the left front face 30 of the nozzle support member 20. Further, it is to be noted that the sealing ring members required for a proper sealing of the cooling circulation system are not shown in the drawings for the sake of clarity. As a cooling medium, preferably water can be used.

The advantages of a nozzle assembly having a design as described above can be summed up as follows:

Homogenous efficient cooling of the nozzle 1 up to its outlet end;

Additional cooling of the powder supply channels, resulting in the further advantage that no molten deposits of coating powders can build up in the interior of the nozzle 1;

Forced circulation of the cooling medium, resulting in the further advantage that no dead storage of standing water occurs;

Simple design and easy replacement of the nozzle 1;

Increased useful service life.

What is claimed is:

1. A nozzle assembly for use in a torch head of a plasma torch apparatus, comprising:

a nozzle means including a nozzle body means of essentially cylindrical configuration having a central longitudinal axis;

an opening running through said nozzle body means and being located coaxially with said central longitudinal axis, said opening having an inlet end and an outlet end;

a plurality of cooling channels running through the interior of said nozzle body means and being arranged symmetrically around said central longitudinal axis;

at least two powder supply channels located in the region of said outlet end of said opening, said at least two powder supply channels extending in essentially radial direction with respect to said central longitudinal axis and opening into said opening;

each of said cooling channels extending in axial direction through said nozzle body means up to said outlet end of said opening;

each of said powder supply channels running through said nozzle body means from an outside thereof and between two adjacent cooling channels to said opening;

a nozzle support means having a central opening adapted for receiving said nozzle body means;

said nozzle support means being provided with cooling duct means that are adapted to be hydraulically coupled to said cooling channels provided in said nozzle body means such as to constitute a nozzle cooling circulation system, said nozzle support means being provided with a collar means protruding into said opening adapted to receive said nozzle means, said collar means being provided with a recess corresponding in shape and dimension to an annular groove provided in an annular end face means of said nozzle body means, whereby said cooling duct means of said nozzle support means communicate with said recess.

2. A nozzle assembly according to claim 1 in which said cooling duct means of said nozzle support means communicate with said recess via radially running passages provided in said nozzle support means.

3. A nozzle for use in a torch head of a plasma torch apparatus, comprising:

a nozzle body means of essentially cylindrical configuration having a central longitudinal axis;

an opening running through said nozzle body means and being located coaxially with said central longitudinal axis, said opening having an inlet end and an outlet end;

a plurality of cooling channels running through the interior of said nozzle body means and being arranged symmetrically around said central longitudinal axis, said plurality of cooling channels having opposite end portions;

at least two powder supply channels located in the region of said outlet end of said opening and intermediate said opposite end portions of said cooling channels, said at least two powder supply channels extending in essentially radial direction with respect to said central longitudinal axis and opening into said opening;

each of said cooling channels extending in axial direction through said nozzle body means up to said outlet end of said opening;

each of said powder supply channels lying between two adjacent cooling channels;

each of said powder supply channels running through said nozzle body means from an outside thereof to said opening.

4. A nozzle according to claim 3 in which the outside of said nozzle body means is provided with an annular channel located in the region of said inlet end of said opening, each of said cooling channels opening into said annular channel.

5. A nozzle according to claim 3 in which said nozzle body means comprises an annular end face means located in the region of said outlet end of said opening, each of said cooling channels opening into said annular channel.

6. A nozzle according to claim 5 in which said annular end face means is provided with an annular groove communicating with said cooling channels.

7. A nozzle according to claim 3 in which said cooling channels extend substantially parallel to said central longitudinal axis.

8. A nozzle according to claim 3 in which said nozzle body means is provided with an insert means made of a high melting material, preferably of tungsten or a tungsten alloy.

9. A nozzle according to claim 3 in which said nozzle body means is provided with twelve cooling channels.

10. A nozzle assembly for use in a torch head of a plasma torch apparatus, comprising:

a nozzle means including a nozzle body means of essentially cylindrical configuration having a central longitudinal axis;

an opening running through said nozzle body means and being located coaxially with said central longitudinal axis, said opening having an inlet end and an outlet end;

a plurality of cooling channels running through the interior of said nozzle body means and being arranged symmetrically around said central longitudinal axis, said plurality of cooling channels having opposite end portions;

at least two powder supply channels located in the region of said outlet end of said opening and intermediate said opposite end portions of said cooling channels, said at least two powder supply channels extending in essentially radial direction with respect to said central longitudinal axis and opening into said opening;

each of said cooling channels extending in axial direction through said nozzle body means up to said outlet end of said opening;

each of said powder supply channels lying between two adjacent cooling channels;

each of said powder supply channels running through said nozzle body means from an outside thereof to said opening;

a nozzle support means having a central opening adapted for receiving said nozzle body means;

said nozzle support means being provided with cooling duct means that are adapted to be hydraulically coupled to said cooling channels provided in said nozzle body means such as to constitute a nozzle cooling circulation system.

11. A nozzle assembly according to claim 10 in which said cooling duct means provided in said nozzle support means are running up to a front face of said nozzle support means that is located in the region of said inlet end of said opening of said nozzle body means.

12. A nozzle assembly according to claim 10 in which said nozzle support means is provided with an interior having a recess, said recess corresponding in shape and position to said annular channel provided in said nozzle body means.

13. A nozzle assembly according to claim 12 in which said recess is led to a front face of said nozzle support means that is located in the region of said inlet end of said opening of said nozzle body means by means of channels provided in said nozzle support means.

14. A nozzle assembly according to claim 10 in which both the inlet and the outlet of said nozzle cooling circulation system open up to a front face of said nozzle support means that is located in a region of said end-region of said opening of said nozzle body means.

* * * * *